(12) United States Patent
Milfs

(10) Patent No.: US 8,573,922 B2
(45) Date of Patent: Nov. 5, 2013

(54) BEARING SUPPORT

(75) Inventor: Wallace L. Milfs, Indianapolis, IN (US)

(73) Assignee: Rolls-Royce Corporation, Indianapolis, IN (US)

(*) Notice: Subject to any disclaimer, the term of this patent is extended or adjusted under 35 U.S.C. 154(b) by 813 days.

(21) Appl. No.: 12/815,539

(22) Filed: Jun. 15, 2010

(65) Prior Publication Data

US 2011/0305567 A1    Dec. 15, 2011

(51) Int. Cl.
*F01B 25/16* (2006.01)
*F01D 21/00* (2006.01)

(52) U.S. Cl.
USPC ............... 415/9; 415/229; 416/2; 416/244 A; 384/99; 384/624

(58) Field of Classification Search
USPC .......... 416/2, 244 A, 244 R; 415/9, 229, 230, 415/231, 170.1; 384/99, 535, 581, 624
See application file for complete search history.

(56) References Cited

U.S. PATENT DOCUMENTS

| 3,395,857 | A |   | 8/1968 | Petrie et al. |
|---|---|---|---|---|
| 4,668,105 | A | * | 5/1987 | Furukawa et al. ............... 384/99 |
| 5,417,501 | A | * | 5/1995 | Hyde et al. .................... 384/542 |
| 5,733,050 | A |   | 3/1998 | Diepolder et al. |
| 6,009,701 | A |   | 1/2000 | Freeman et al. |
| 6,447,248 | B1 |   | 9/2002 | Kastl et al. |
| 7,036,990 | B2 |   | 5/2006 | Woehrl |
| 7,237,959 | B2 | * | 7/2007 | Bouchy et al. ................ 384/445 |
| 2005/0172608 | A1 |   | 8/2005 | Lapergue et al. |
| 2009/0155073 | A1 |   | 6/2009 | Servant |

FOREIGN PATENT DOCUMENTS

| EP | 1308602 A1 | 5/2003 |
|---|---|---|
| EP | 1314858 A2 | 5/2003 |

OTHER PUBLICATIONS

European Search Report, dated Jan. 3, 2013, pp. 1-6, European Patent Application No. 11250588.8, European Patent Office, Netherlands.

* cited by examiner

*Primary Examiner* — Edward Look
*Assistant Examiner* — Christopher C Williams
(74) *Attorney, Agent, or Firm* — Krieg DeVault LLP

(57) ABSTRACT

A bearing support is disclosed herein. The bearing support includes a pilot ring encircling an axis. The pilot ring is operable to be substantially-fixed in operation. The bearing support also includes a damper ring operable to receive an outer race of a bearing assembly. The bearing support also includes a fuse pin extending through aligned apertures in the pilot ring and the damper ring to prevent relative radial movement between the pilot ring and the damper ring up to a predetermined amount of loading. The fuse pin is operable to fracture in response to loading beyond the predetermined amount. The bearing support also includes a retainer extending through one of the pilot ring and the damper ring and fixed to the other of the pilot ring and the damper ring. The fuse pin is engaged with at least one of the first and second apertures through a heat shrink fit.

20 Claims, 5 Drawing Sheets

BEARING SUPPORT

BACKGROUND OF THE INVENTION

1. Field of the Invention

The invention relates to a bearing support structure including a mechanical fuse and also a method for manufacturing such a bearing support.

2. Description of Related Prior Art

U.S. Pat. No. 6,009,701 discloses a ducted fan gas turbine engine having a frangible connection. The ducted fan gas turbine engine is provided with a fan which is carried by a shaft. A frangible fuse ring maintains the shaft carrying the fan coaxial with the engine longitudinal axis. In the event of severe fan damage, a fuse ring fractures and the fan shaft orbits about the engine longitudinal axis. A pair of threaded members, one of which is of generally frusto-conical configuration, cooperate as a result of the orbiting motion to restore the coaxial relationship between the fan shaft and the engine longitudinal axis.

SUMMARY OF THE INVENTION

In summary, the invention is a bearing support. The bearing support includes a pilot ring encircling an axis. The pilot ring is operable to be substantially-fixed in operation. The bearing support also includes a damper ring operable to receive an outer race of a bearing assembly. The damper ring also encircles the axis. The bearing support also includes a fuse pin extending through aligned apertures in the pilot ring and the damper ring to prevent relative radial movement between the pilot ring and the damper ring up to a predetermined amount of loading. The fuse pin is operable to fracture in response to loading beyond the predetermined amount. The bearing support also includes a retainer extending through one of the pilot ring and the damper ring and fixed to the other of the pilot ring and the damper ring. The retainer is operable to limit relative axial movement between the pilot ring and the damper ring. The retainer limits relative axial movement when the fuse pin fractures in response to loading beyond the predetermined amount. The fuse pin is engaged with at least one of the first and second apertures through a heat shrink fit.

BRIEF DESCRIPTION OF THE DRAWINGS

Advantages of the present invention will be readily appreciated as the same becomes better understood by reference to the following detailed description when considered in connection with the accompanying drawings wherein.

DETAILED DESCRIPTION OF EXEMPLARY EMBODIMENTS

Figure 1:
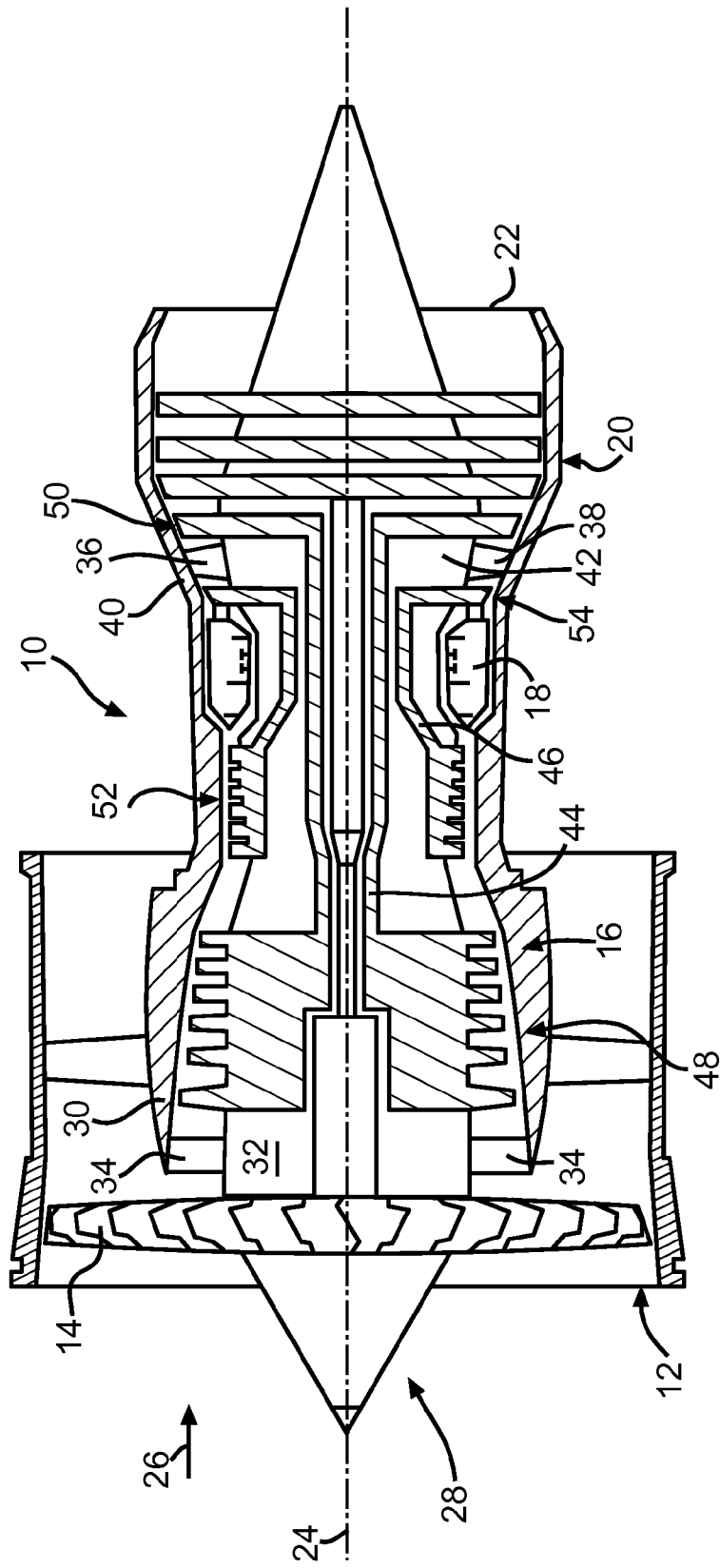
FIG. 1 is a schematic cross-section of a turbine engine incorporating an exemplary embodiment of the invention.

A plurality of different embodiments of the invention is shown in the Figures of the application. Similar features are shown in the various embodiments of the invention. Similar features have been numbered with a common reference numeral and have been differentiated by an alphabetic suffix. Also, to enhance consistency, the structures in any particular drawing share the same alphabetic suffix even if a particular feature is shown in less than all embodiments. Similar features are structured similarly, operate similarly, and/or have the same function unless otherwise indicated by the drawings or this specification. Furthermore, particular features of one embodiment can replace corresponding features in another embodiment or can supplement other embodiments unless otherwise indicated by the drawings or this specification.

The embodiments of the invention disclosed below provide an improved bearing support by connecting the pilot ring and the damper ring with a fuse pin heat shrunk to at least one or both of the rings. The rings can be subjected to final machining or finishing when assembled together, reducing dimensional variation and improving part life.

Referring to FIG. 1, a turbine engine 10 can include an inlet 12 and a fan 14. The exemplary fan 14 can be a bladed disk assembly having a disk or hub defining a plurality of slots and a plurality of fan blades, each fan blade received in one of the slots. In alternative embodiments of the invention, the fan can be a blisk wherein the hub and blades are integrally formed and unitary. The turbine engine can also include a compressor section 16, a combustor section 18, and a turbine section 20. The turbine engine 10 can also include an exhaust section 22. The fan 14, compressor section 16, and turbine section 20 include components arranged to rotate about a centerline axis 24. Fluid such as air can be drawn into the turbine engine 10 as indicated by the arrow referenced at 26. The fan 14 directs fluid to the compressor section 16 where it is compressed. A portion of the fluid can be diverted radially outside of the compressor section 16 and thereby become bypass flow. The compressed fluid emerging from the compressor section 16 is mixed with fuel and ignited in the combustor section 18. Combustion gases exit the combustor section 18 and flow through the turbine section 20. Energy is extracted from the combustion gases in the turbine section 20.

A nose cone assembly 28 can be attached to the fan 14. A turbine case 30 can encircle the core engine components (the compressor, combustor and turbine sections 16, 18, 20). The turbine case 30 can be fixed to a non-rotating hub 32 through a plurality of struts 34. Downstream of the combustor section 18, a row of turbine vanes, such as vanes 36, 38 can be positioned to direct the flow of combustion gases to the turbine section 20. The vanes 36, 38 can extend radially relative to the centerline axis 24, between an outer case 40 and an inner case 42. The outer case 40 can be integral with or separately formed from the case 30.

Shafts 44, 46 are shown disposed for rotation about the centerline axis 24 of the turbine engine 10. Alternative embodiments of the invention can include any number of shafts. The shafts 44, 46 can be journaled together for relative rotation. The shaft 44 can be a low pressure shaft supporting compressor blades 48 of a low pressure portion of the compressor section 16. The shaft 44 can also support low pressure turbine blades 50 of a low pressure portion of the turbine section 20. The shaft 46 encircles the shaft 44. Bearings can be disposed between the shafts 44, 46. The shaft 46 can be a high pressure shaft supporting compressor blades 52 of a high pressure portion of the compressor section 16. The shaft 46 can also support high pressure turbine blades 54 of a high pressure portion of the turbine section 20.

Figure 2:
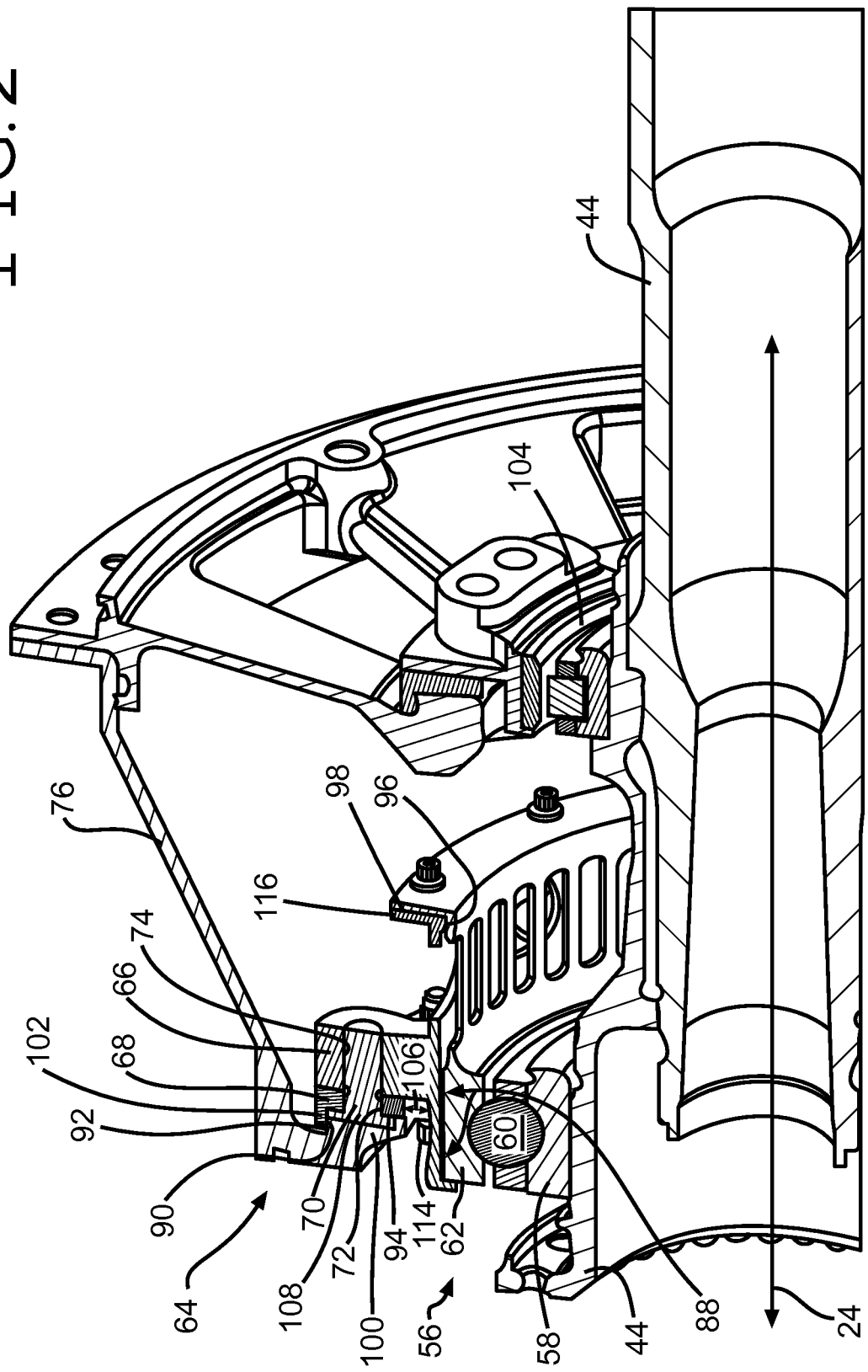
FIG. 2 is a detailed and perspective cross-section of an exemplary embodiment of the invention wherein the cross-section is taken along a centerline axis of a turbine engine.

FIG. 2 shows the shaft 44 can be supported by a bearing assembly 56 having an inner race 58 fixed to the shaft 44, a plurality of rollers 60 disposed about the inner race 58, and an outer race 62 encircling the plurality of rollers 60. The bearing assembly 56 can be supported by substantially-fixed structures of the turbine engine through a bearing support 64.

The exemplary bearing support 64 can include a damper ring 66 operable to receive the outer race 62. The damper ring 66 can encircle the centerline axis 24. The exemplary bearing support 64 can also include a pilot ring 68 encircling the centerline axis 24. The pilot ring 68 is operable to be substantially-fixed in operation. Substantially-fixed refers to the fact that the pilot ring 68 is not intended to move along the centerline axis 24 during operation. However, minor movement such as vibration can occur. Also, substantially-fixed refers to the fact that the pilot ring 68 is not intended to rotate in operation.

The exemplary bearing support 64 can also include a fuse pin 70 extending through apertures in the pilot ring 68 and the damper ring 66. The fuse pin 70 can extend through a first aperture 72 defined in the pilot ring 68 and a second aperture 74 in the damper ring 66. The fuse pin 70 can prevent relative radial movement between the pilot ring 68 and the damper ring 66 up to a predetermined amount of loading. The fuse pin 70 is operable to fracture in response to loading beyond the predetermined amount. The fuse pin 70 can have a length defined along the centerline axis 24 and a substantially constant cross-section along the length with a narrowed portion positioned along the centerline axis 24 where the pilot ring 68 and the damper ring 66 abut another. The fuse pin 70 can fracture at the narrowed portion in response to shear loading.

Loading tending to radially move the damper ring 66 relative to the pilot ring 66 can occur, such as, when a fan blade separates from a hub, causing the shaft 44 to wobble about the centerline axis 24. The predetermined amount of loading that the fuse pin 70 can withstand before fracturing can be selected to prevent damage to other structures as the turbine engines shuts down. For example, the pilot ring 68 can be connected to a support housing 76. The support housing 76 can be formed from a material such as aluminum or magnesium to minimize weight. The support housing 76 could be damaged if forced to follow or move with the wobbling shaft 44. Thus, the fuse pin 70 can be formed to fracture when wobbling begins or when wobbling reaches a particular amplitude. This amount of force, or loading, can be determined through experimentation or through previously acquired data.

Figure 3:
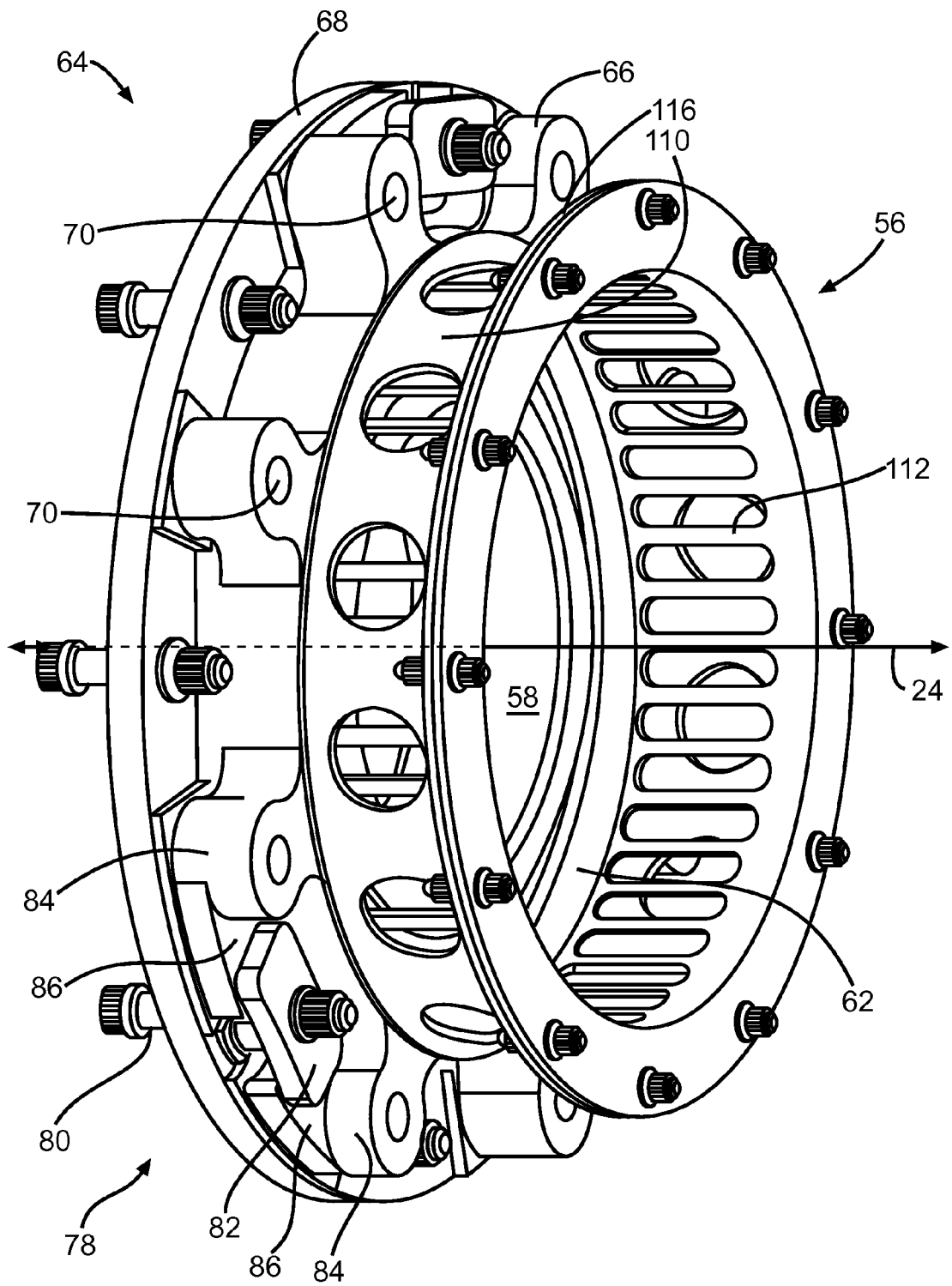
FIG. 3 is a perspective view of the exemplary embodiment shown in cross-section in FIG. 2.

Referring now to FIG. 3, the exemplary bearing support 64 can also include a retainer 78 extending through an aperture in the pilot ring 68. The retainer 78 can be engaged with the damper ring 66. The retainer 78 can be operable to limit relative axial movement between the pilot ring 68 and the damper ring 66. The retainer 78 can limit relative axial movement when the fuse pin 70 fractures in response to loading beyond the predetermined amount.

The exemplary retainer 78 can include a bolt 80 and a plate 82. The bolt 80 can pass through the support housing 76 (shown in FIG. 2) and the pilot ring 68 or just the pilot ring 68. The fuse pins 70 can be received in protuberances 84 of the exemplary damper ring 66 and the bolt 80 can extend between adjacent protuberances 84. The plate 82 can engage a structure of the damper ring 66 to limit relative axial movement when the fuse pin 70 fractures in response to loading beyond the predetermined amount. In the first exemplary embodiment, the plate 82 can engage projections 86 extending between adjacent protuberances 84. The bolt 80 can be disposed in a slot defined between opposing projections 86. The structure through which the bolt 80 passes through the damper ring 66 can be a circular aperture, an open slot, a closed slot, or any other shape. The retainer 78 and damper ring 66 can be assembled with a locating clearance gap, wherein the bolt 80 can be located easily during assembly but will not impart a frictional load on the damper ring 66 during relative radial movement between the pilot ring 68 and the damper ring 66. This will substantially reduce the possibility that contact between the damper ring 66 and the bolt 80, or the damper ring 66 and the plate 82, could add uncertainty as to the breaking load of the fuse pin 70 (the predetermined amount of loading).

In one method for assembling the bearing support 64, the damper ring 66 and the pilot ring 68 can be positioned together in a fixture. This can enhance the concentricity of various surfaces of the damper ring 66 and the pilot ring 68. Referring again to FIG. 2, squeeze film damper gaps 88 can be positioned between the outer race 62 and the damper ring 66. The concentricity of the gaps 88 and a pilot diameter 90 of the pilot ring 68 can be important for the operation of the bearing assembly 56. The pilot diameter 90 can be the surface that locates the bearing support 64 relative to the support housing 76. In the exemplary embodiment, the pilot diameter 90 and a mating surface 92 on the support housing 76 cooperate to locate the bearing support 64 during assembly. The pilot diameter 90 can be finished prior to the pilot ring 68 and the damper ring 66 being positioned together in the fixture, or can be finished when the pilot ring 68 and damper ring 66 are positioned together in the fixture. Also, a pilot face 94 can be can be finished prior to the pilot ring 68 and the damper ring 66 being positioned together in the fixture.

By positioning the damper ring 66 and the pilot ring 68 together in a fixture, features like the surfaces for the squeeze film damper gaps 88 can be machined/finished in view of the pilot diameter 90. The pilot diameter 90 can be the surface that locates the bearing support 64 radially with respect to the centerline axis 24 and the pilot face 94 can be the surface that locates the bearing support 64 axially, or along the centerline axis 24. Surfaces on the damper ring 66 can be finished when the pilot ring 68 and the damper ring 66 being positioned together in the fixture, after these axial and radial locating surfaces are established.

Prior to finishing features like the surfaces for the squeeze film damper gaps 88, aligned apertures for the fuse pin 70 can be formed in the damper ring 66 and the pilot ring 68 during the positioning step (as the damper ring 66 and the pilot ring 68 are positioned together in the fixture). The pilot ring 68 and the damper ring 66 can be mated in a fixture on the outer shape of each part. Apertures for the fuse pins 70 can be match drilled and reamed through both the pilot ring 68 and the damper ring 66 as the fixtures are positioned together in a fixture.

After forming apertures 72, 74 in the pilot ring 68 and the damper ring 66 for the fuse pins 70, the fuse pins 70 are assembled with a heat shrink fit into the apertures 72, 74. In other words, the pilot ring 68 and the damper ring 66 can be heated above the range of operating temperature for the bearing support 64 so that the size of the apertures is maximized. In addition or alternatively, the fuse pins 70 can be cooled below the range of operating temperature so that the size of the fuse pins 70 is minimized. The fuse pin 70 can be inserted into the aperture 72, 74 and the temperatures of the fuse pin 70, the pilot ring 68, and the damper ring 66 can be allowed to reach equilibrium. When the temperature of the fuse pins 70, the pilot ring 68, and the damper ring 66 is generally the same, the fuse pins 70 will be subjected to a compressive force within the apertures 72, 74, increasing friction and preventing removal. This joins the pilot ring 68, and the damper ring 66 into a relatively permanent assembly, held together by the substantial friction force of the interference fit. The diameters for the squeeze film damper gaps 88, a bearing pilot diameter 96, and a bearing pilot face 98 can then be ground concentric and parallel relative to the pilot diameter 90 and the pilot face 94. The surfaces defining the diameters for the squeeze film damper gaps 88, a bearing pilot diameter 96, and a bearing pilot face 98 are thus finished during the engagement of the damper ring 66 and the pilot ring 68 through the fuse pins 70.

The support housing 76 and the pilot ring 68 can be formed from materials having different coefficients of thermal expansion such that an interference fit is generated during operation after temperatures of the support housing 76 and the pilot ring 68 have risen. For example, the pilot ring 68 can be formed from steel and the support housing 76 can be formed from aluminum or magnesium. The surface 92 of the support housing 76 receives the pilot diameter 90 during assembly. The surface 92 can be defined by a locating ring 100 of the support housing 76. The pilot diameter 90 can be defined on a first lip 102 extending along the centerline axis 24 from the pilot face 94. The first lip 102 slips around the locating ring 100 during assembly.

During operation, the support housing 76 can thermally expand at a greater rate than the pilot ring 68. As a result, the locating ring 100 will press radially outward against the first lip 102. This can be desirable for two reasons. First, the interference fit during operation will reduce the likelihood that the bearing support 64 will move and the bearing 56 will remain concentric with other bearings that support the shaft 44, such as the bearing 104. Second, the interference fit will allow for vibration to be transmitted between the support housing 76 and the pilot ring 68, thereby reducing/eliminating fretting wear.

The arrangement of the first exemplary embodiment can isolate stress generated by the interference fit between the locating ring 100 and the first lip 102 at the corner where the first lip 102 intersects the pilot face 94. The interference fit is axially and radially spaced from the fuse pin 70 relative to the centerline axis 24. This can isolate the fuse pin 70 from preloading that might otherwise be caused by the interference fit. This preloading could cause uncertainty regarding the level of loading that will cause the fuse pin 70 to fracture.

The isolation of stress at the corner can be enhanced by the selection of sizes of the first lip 102 and the remainder of the pilot ring 68. For example, the first lip 102 can be relatively thin, wherein the thickness is defined radially relative to the centerline axis 24. On the other hand, the remainder of the pilot ring 68, the ring portion, can be relatively thick with the thickness being defined along the centerline axis 24. The thickness of the ring portion can be two to three times as large as the thickness of the first lip 102. As a result, the stress generated by expansion of the support housing 76 can be washed out before being transmitted to the fuse pin 70.

A second lip can 106 extend from the locating ring 100 to contact the pilot ring 68 at a position radially inward of the first lip 102 and radially inward of the fuse pin 70. The second lip 106 and the locating ring 100 can be integral. The fuse pin 70 can include a head 108 positioned radially between the first and second lips 102, 106 and axially between the pilot ring 68 and the support housing 76. The head 108 can fill the axial gap between the pilot ring 68 and the support housing 76 and extend radially past both sides of the aperture 72 to at least partially fill the radial gap between the first and second lips. This arrangement further prevents bending of the fuse pin 70 when the support housing 76 grows more than the pilot ring 68 during operation. For example, the locating ring 100, the head 108, the pilot ring 68, and the damper ring 66 can be layered together along the axis 24, preventing bending in any one of the layers and also in the fuse pin 70.

Figure 4:
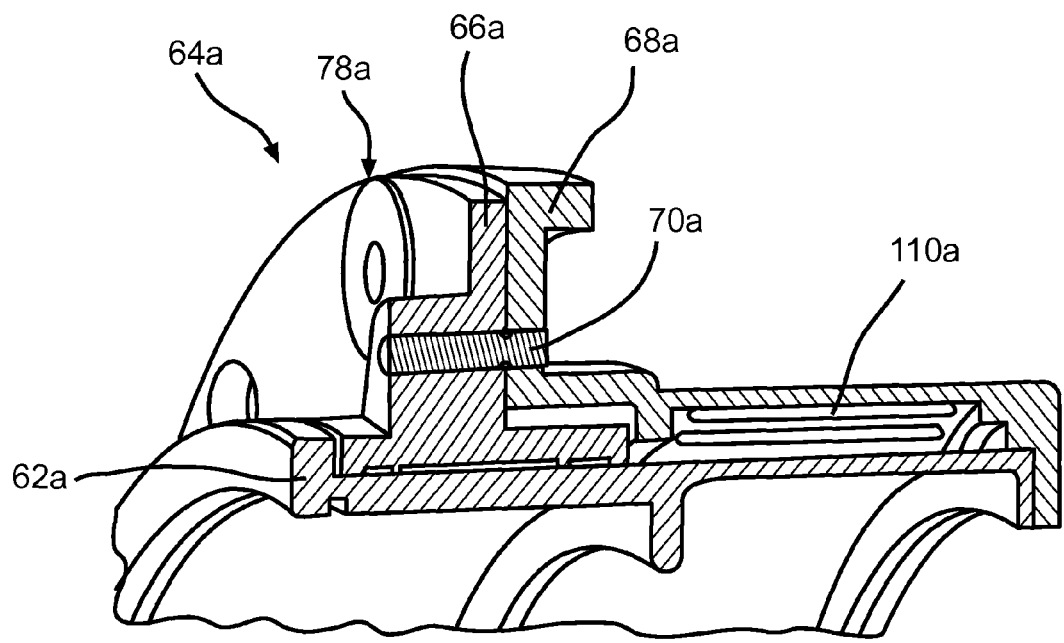
FIG. 4 is a first detailed and perspective cross-section of another exemplary embodiment of the invention wherein the cross-section is taken along a centerline axis of a turbine engine.
Figure 5:
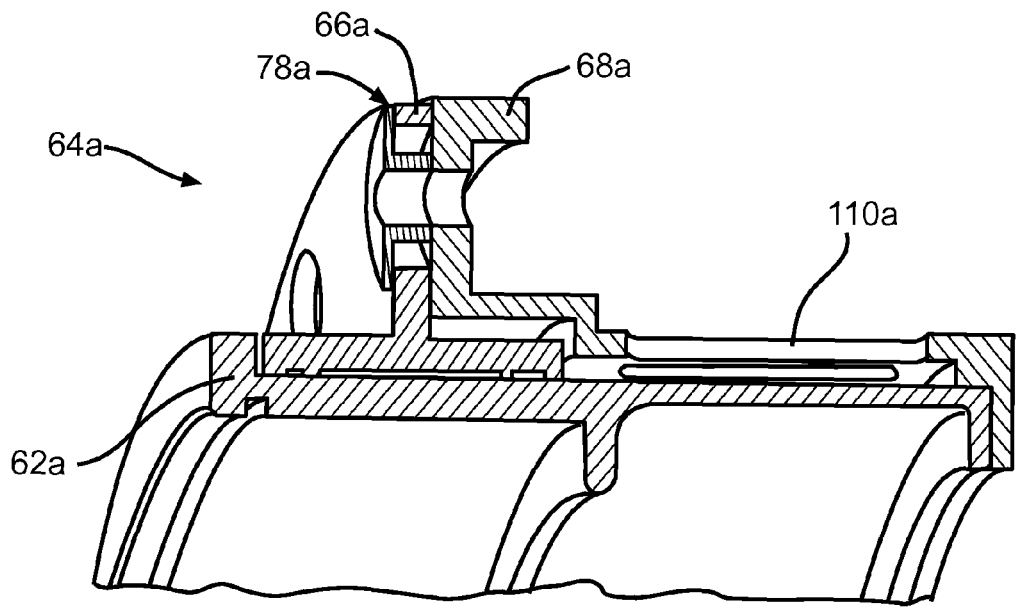
FIG. 5 is a second detailed and perspective cross-section of the exemplary embodiment shown in FIG. 4 wherein the cross-sections of FIGS. 4 and 5 are both taken through planes angled from one another about the centerline axis and each plane passes through the centerline axis.

A second embodiment is shown in FIGS. 4 and 5, wherein a bearing support 64a includes a pilot ring 68a encircling an axis. The pilot ring 68a is operable to be substantially-fixed in operation. The bearing support 64a also includes a damper ring 66a operable to receive an outer race 62a of a bearing assembly. The damper ring 66a also encircles the axis. The bearing support 64a also includes a fuse pin 70a extending through apertures in the damper ring 66a and the pilot ring 68a to prevent relative radial movement between the pilot ring 68a and the damper ring 66a up to a predetermined amount of loading. The fuse pin 70a is operable to fracture in response to loading beyond the predetermined amount. The bearing support 64a also includes a retainer 78a extending through the damper ring 66a and fixed to the pilot ring 68a. The retainer 78a is operable to limit relative axial movement between the pilot ring 68a and the damper ring 66a. The retainer 78a limits relative axial movement when the fuse pin 70a fractures in response to loading beyond the predetermined amount. The fuse pin 70a is engaged with the pilot ring 68a and the damper ring 66a through a heat shrink fit. FIG. 4 shows a cross-section through the fuse pin 70a. FIG. 5 shows a cross-section through the retainer 78a. The pilot ring 68a and the damper ring 66a abut and contact one another radially outward and radially inward of the fuse pin 70a to isolate the fuse pin 70a from loading due to different rates of thermal growth between the pilot ring 68a and a support housing (not shown).

Referring again to FIG. 3, the damper ring 66 can include a flange 116 extending radially relative to the axis 24. The bearing pilot face 98 is defined by the flange 116. The flange 116 is operable to limit movement of a bearing assembly 56 along the axis 24. The flange 116 can carry axial thrust load carried by the bearing assembly 56. In the first exemplary embodiment, the outer race 62 and the damper ring 66 are fixed together at the flange 116, a first end of the damper ring 66 along the centerline axis 24. This first end of the damper ring 66 can be spaced from the squeeze film damper gaps 88 (shown in FIG. 2) which can be disposed at a second end of the damper ring 66 along the centerline axis 24.

A plurality of spring bars 110 can extend along the axis 24 between the flange 116 and a main body of the damper ring 66 in which the fuse pin 70 is attached. The spring bars 110 can carry the axial thrust load to the support housing 76 without frictional contact between the bearing outer race 62 and damper ring 66. The spring bars 110 can also center the shaft 44 (and any fan attached to the shaft 44) in the damper gaps, such as gap 114 in FIG. 2, against the weight of the parts. In the exemplary embodiment, the outer race 62 also defines a plurality of spring bars 112. FIGS. 4 and 5 show an embodiment in which the pilot ring 68a defines spring bars 110a.

Figure 6:
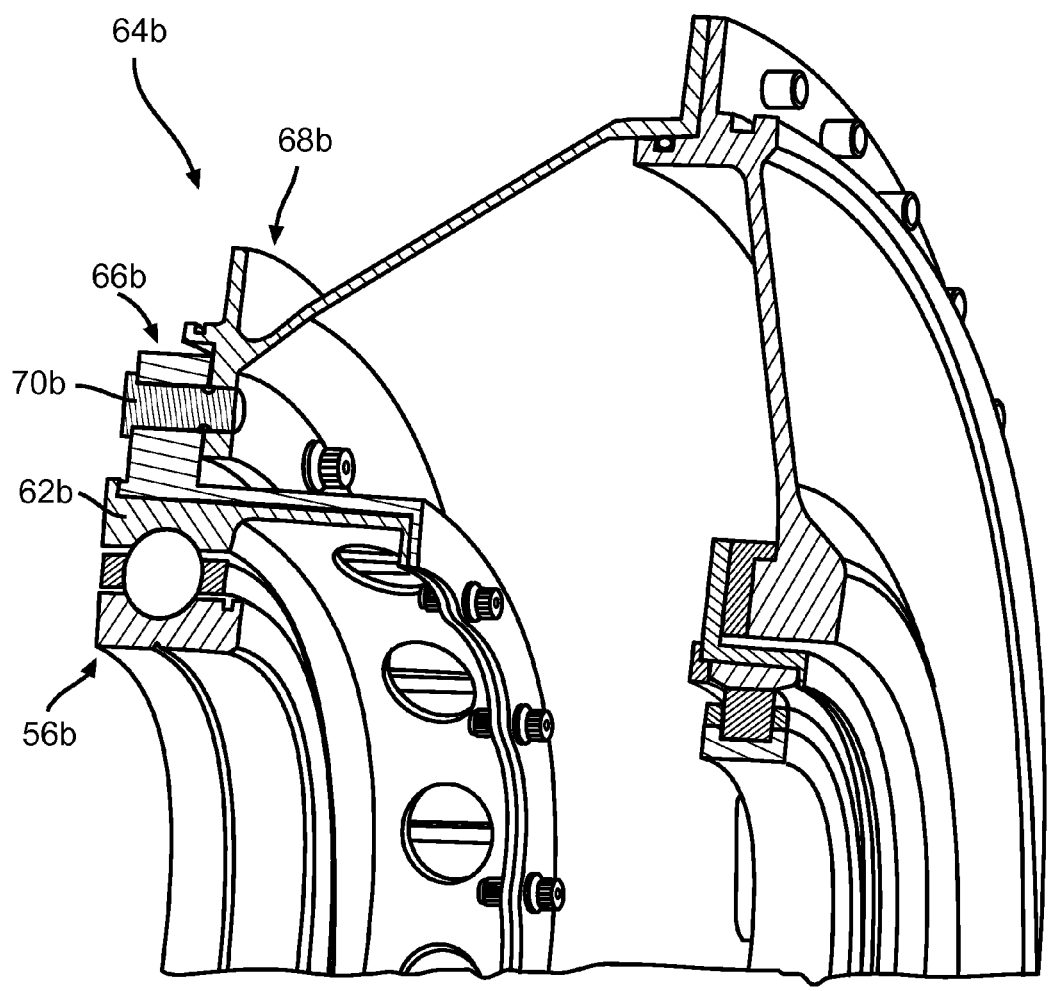
FIG. 6 is a detailed and perspective cross-section of another exemplary embodiment of the invention.

FIG. 6 shows another embodiment of the invention. A bearing support 64b includes a pilot ring 68b encircling an axis. The pilot ring 68b is operable to be substantially-fixed in operation. The pilot ring 68b generally integrates the pilot ring 68 and support housing 76 shown in the first embodiment. The bearing support 64b also includes a damper ring 66b operable to receive an outer race 62b of a bearing assembly 56b. The damper ring 66b also encircles the axis. The bearing support 64b also includes a fuse pin 70b extending through apertures in the damper ring 66b and the pilot ring

68b to prevent relative radial movement between the pilot ring 68b and the damper ring 66b up to a predetermined amount of loading. The fuse pin 70b is operable to fracture in response to loading beyond the predetermined amount. The bearing support 64b also includes a retainer (not visible) operable to limit relative axial movement between the pilot ring 68b and the damper ring 66b. The retainer limits relative axial movement when the fuse pin 70b fractures in response to loading beyond the predetermined amount. The fuse pin 70b is engaged with the pilot ring 68b and the damper ring 66b through a heat shrink fit. It is noted that in the embodiment shown in FIG. 6 the thrust loading of the bearing assembly 56b would be directed to the right (with respect to the orientation of the drawing) and that in the embodiment shown in FIG. 2 the thrust loading of the bearing assembly 56 would be directed to the left (with respect to the orientation of the drawing).

It is noted that in the exemplary embodiment it is preferred that the fuse pin is engaged with both the pilot ring and the damper ring through respective heat shrink fits. However, it is possible to have an embodiment of the invention wherein the fuse pin is engaged with only one of the pilot ring and the damper ring through a heat shrink fit. For example, with reference to FIG. 2, the fuse pin 70 could be engaged with the damper ring 66 with a heat shrink fit but not similarly engaged with the pilot ring 68. The head 108 of the fuse pin 70 can cooperate with the heat shrink fit between the fuse pin 70 and the damper ring 66 to effectively capture the pilot ring 68.

While the invention has been described with reference to an exemplary embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims. Further, the "invention" as that term is used in this document is what is claimed in the claims of this document. The right to claim elements and/or sub-combinations that are disclosed herein as other inventions in other patent documents is hereby unconditionally reserved.

What is claimed is:

1. A bearing support comprising:
   a pilot ring encircling an axis and operable to be substantially-fixed in operation;
   a damper ring operable to receive an outer race of a bearing assembly and encircling said axis;
   a fuse pin extending through aligned apertures in said damper ring and said pilot ring to prevent relative radial movement between said pilot ring and said damper ring up to a predetermined amount of loading, said fuse pin operable to fracture in response to loading beyond the predetermined amount;
   a retainer extending through one of said damper ring and said pilot ring and fixed to the other of said damper ring and said pilot ring, said retainer operable to limit relative axial movement between said pilot ring and said damper ring, said retainer limiting relative axial movement when said fuse pin fractures in response to loading beyond the predetermined amount; and
   wherein said fuse pin is engaged with at least one of said damper ring and said pilot ring through a heat shrink fit.

2. The bearing support of claim 1 wherein said fuse pin is engaged with both of said damper ring and said pilot ring through a heat shrink fit.

3. The bearing support of claim 1 further comprising:
   a support housing encircling said axis and having a locating ring; and
   a first lip extending along said axis from a pilot face of said pilot ring, wherein said first lip slips around said locating ring during assembly and wherein said support housing and said pilot ring are formed from materials having different coefficients of thermal expansion such that an interference fit is generated during operation after temperatures of said support housing and said pilot ring have risen above pre-operating temperature.

4. The bearing support of claim 3 wherein said support housing further comprises:
   a second lip extending from said locating ring to contact said pilot ring at a position radially inward of said first lip and radially inward of said fuse pin.

5. The bearing support of claim 4 wherein said fuse pin includes a head positioned radially between said first and second lips and axially between said pilot ring and said support housing, wherein said head fills the axial gap between said pilot ring and said support housing and extends radially past both sides of said aperture in said pilot ring to at least partially fill the radial gap between said first and second lips.

6. The bearing support of claim 1 wherein a locating clearance gap is defined between said retainer and said pilot ring to prevent friction between said retainer and said pilot ring from affecting the predetermined amount of loading.

7. The bearing support of claim 1 wherein said damper ring further comprises:
   a flange extending radially relative to said axis, said flange operable to limit movement of a bearing assembly along said axis.

8. The bearing support of claim 7 wherein said damper ring further comprises:
   a plurality of spring bars extending along said axis between said flange and said fuse pin.

9. The bearing support of claim 8 wherein said pilot ring further comprises:
   a flange extending radially relative to said axis, said flange operable to limit movement of a bearing along said axis; and
   a plurality of spring bars extending along said axis between said flange and said fuse pin.

10. A method of manufacturing a bearing support comprising the steps of:
    limiting relative axial movement between a damper ring operable to receive an outer race of a bearing assembly and a pilot ring operable to be substantially-fixed in operation with a fuse pin extending through aligned apertures in the damper ring and the pilot ring, the fuse pin operable to prevent relative radial movement between the pilot ring and the damper ring up to a predetermined amount of loading, wherein the fuse pin is operable to fracture in response to loading beyond the predetermined amount;
    limiting relative axial movement between the pilot ring and the damper ring with a retainer extending through one of the damper ring and the pilot ring and fixed to the other of the damper ring and the pilot ring, the retainer limiting relative axial movement between the damper ring and the pilot ring when the fuse pin fractures in response to loading beyond the predetermined amount; and
    engaging the fuse pin with at least one of the damper ring and pilot ring through a heat shrink fit.

11. The method of claim 10 further comprising the steps of:
positioning the damper ring and the pilot ring together in a fixture prior to said engaging step; and
forming the aligned apertures for the fuse pin in the damper ring and the pilot ring during said positioning step.

12. The method of claim 11 further comprising the step of:
finishing surfaces on the damper ring during said engaging step.

13. The method of claim 12 wherein said finishing step includes:
machining an inside diameter of the damper ring in which a bearing outer race is received as the insider diameter is fixed relative to a locating surface defined by the pilot ring.

14. The method of claim 11 further comprising the steps of:
forming squeeze film damper gaps in the damper ring; and
forming a radial flange on one of the damper ring and the pilot ring to carry axial thrust load of a bearing.

15. A turbine engine comprising:
a shaft operable to rotate about a centerline axis;
a bearing assembly supporting said shaft for rotation and having an inner race fixed to said shaft, a plurality of rollers disposed about said inner race, and an outer race encircling said plurality of rollers;
a damper ring operable to receive said outer race of a bearing assembly and encircling said centerline axis;
a pilot ring encircling said centerline axis and operable to be substantially-fixed in operation;
a fuse pin extending through apertures in said pilot ring and said damper ring to prevent relative radial movement between said pilot ring and said damper ring up to a predetermined amount of loading, said fuse pin operable to fracture in response to loading beyond the predetermined amount;
a retainer extending through one of said pilot ring and said damper ring and fixed to the other of said pilot ring and said damper ring, said retainer and operable to limit relative axial movement between said pilot ring and said damper ring, said retainer limiting relative axial movement when said fuse pin fractures in response to loading beyond the predetermined amount; and
wherein said fuse pin is engaged with at least one of said pilot ring and said damper ring through a heat shrink fit.

16. The turbine engine of claim 15 wherein said fuse pin is engaged with both of said pilot ring and said damper ring through a heat shrink fit.

17. The turbine engine of claim 16 further comprising:
a support housing encircling said centerline axis and having a locating ring;
a first lip cantilevered off of a pilot face of said pilot ring, wherein said first lip slips around said locating ring during assembly and wherein said support housing and said pilot ring are formed from materials having different coefficients of thermal expansion such that an interference fit between said locating ring and said first lip is generated during operation after temperatures of said support housing and said pilot ring rise above a predetermined temperature; and
wherein said interference fit is axially and radially spaced from said fuse pin relative to said centerline axis.

18. The turbine engine of claim 17 wherein said pilot ring and said damper ring abut and contact one another radially outward and radially inward of said fuse pin.

19. The turbine engine of claim 18 wherein said fuse pin has a length defined along said centerline axis and a substantially constant cross-section along said length with a narrowed portion positioned along said centerline axis where said pilot ring and said damper ring abut and contact one another.

20. The turbine engine of claim 19 wherein said outer race and said damper ring are fixed together at a first end along said centerline axis and squeeze film damper gaps are defined between said outer race and said damper ring at a second end along said centerline axis.

\* \* \* \* \*